United States Patent
Prasad et al.

(10) Patent No.: US 11,068,554 B2
(45) Date of Patent: Jul. 20, 2021

(54) UNSUPERVISED ENTITY AND INTENT IDENTIFICATION FOR IMPROVED SEARCH QUERY RELEVANCE

(71) Applicant: Microsoft Technology Licensing, LLC, Redmond, WA (US)

(72) Inventors: Gautam Prasad, Hyderabad (IN); Varun Appaswami, Hyderabad (IN); Bhanu Teja Chunduri, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 16/389,825

(22) Filed: Apr. 19, 2019

(65) Prior Publication Data
US 2020/0334307 A1  Oct. 22, 2020

(51) Int. Cl.
*G06F 16/9535* (2019.01)
*G06F 16/9038* (2019.01)
(Continued)

(52) U.S. Cl.
CPC .... *G06F 16/9535* (2019.01); *G06F 16/24578* (2019.01); *G06F 16/9038* (2019.01); *G06F 16/90328* (2019.01)

(58) Field of Classification Search
CPC ......... G06F 16/24578; G06F 16/90328; G06F 16/9038; G06F 16/9535
See application file for complete search history.

(56) References Cited

U.S. PATENT DOCUMENTS

| 9,009,134 B2 | 4/2015 | Xu et al. |
| 2006/0161520 A1 | 7/2006 | Brewer et al. |

(Continued)

FOREIGN PATENT DOCUMENTS

| CN | 104268200 A | 1/2015 |

OTHER PUBLICATIONS

"International Search Report and Written Opinion Issued in PCT Application No. PCT/US20/023050", dated Jun. 9, 2020, 11 Pages.
(Continued)

*Primary Examiner* — Scott A. Waldron
(74) *Attorney, Agent, or Firm* — Medley, Behrens & Lewis, LLC

(57) ABSTRACT

Technologies are described here for, among other things, improving search query relevance by executing a query on a search engine, retrieving search-page-data generated from executing the query, the search-page-data including document-titles and universal resource locators (URLs), each document-title being a title of a document associated with a URL, determining relevant-entity-words in the query from an entity relevance score for matching search terms in the query, Domain-URLs, and Domain-Titles, determining relevant-intent-words in the query from an intent-word relevance score based on a number of times a search term appears in the query and the URLs relative to other search terms in the query and the URLs, comparing each of the determined relevant-entity-words and each of the determined relevant-intent-words with a plurality of stored past-user queries, retrieving the plurality of stored past-user search queries including the relevant-entity-words and the relevant-intent-words, and transmitting a set of query suggestions to a client device.

20 Claims, 12 Drawing Sheets

(51) Int. Cl.
*G06F 16/9032* (2019.01)
*G06F 16/2457* (2019.01)

(56) References Cited

U.S. PATENT DOCUMENTS

| | | | |
|---|---|---|---|
| 2010/0114878 A1 | 5/2010 | Lu et al. | |
| 2012/0059838 A1* | 3/2012 | Berntson | G06F 16/951 707/759 |
| 2012/0084297 A1 | 4/2012 | Mishne et al. | |
| 2012/0158685 A1* | 6/2012 | White | G06F 16/9535 707/706 |
| 2012/0254217 A1* | 10/2012 | Ali | G06F 16/951 707/765 |
| 2013/0006952 A1* | 1/2013 | Wong | G06F 16/9535 707/706 |
| 2014/0019443 A1 | 1/2014 | Golshan | |
| 2015/0317302 A1 | 11/2015 | Liu et al. | |
| 2016/0267183 A1 | 9/2016 | Tan et al. | |
| 2018/0060387 A1 | 3/2018 | Le et al. | |
| 2018/0365328 A1 | 12/2018 | Parikh et al. | |
| 2019/0005089 A1 | 1/2019 | Kempf et al. | |

OTHER PUBLICATIONS

Collins, et al., "Unsupervised Models for Named Entity Classification", In Proceedings of Joint SIGDAT Conference on Empirical Methods in Natural Language Processing and Very Large Corpora, Jun. 21, 1999, pp. 100-110.

Cowan, et al., "Named entity recognition in travel-related search queries", In Proceedings of Twenty-Ninth AAAI Conference on Artificial Intelligence, Jan. 25, 2015, pp. 3935-3941.

Eiselt, et al., "A two-step Names Entity Recognizer for open domain search queries", In International Joint Conference on Natural Language Processing, Oct. 14, 2013, pp. 829-833.

Etzioni, et al., "Unsupervised named-entity extraction from the web: An experimental study", In Journal of Artificial intelligence, vol. 165, Issue 1, Jun. 1, 2005, pp. 1-42.

Guo, et al., "Named Entity Recognition in Query", In Proceedings of the 32nd International ACM SIGIR Conference on Research and Development in Information Retrieval, Jul. 19, 2009, pp. 267-274.

Jain, et al., "Domain-Independent Entity Extraction from Web Search Query Logs", In Proceedings of the 2oth International Conference Companion on World Wide Web, Mar. 28, 2011, pp. 63-64.

Lample, et al., "Neural Architectures for Named Entity Recognition", In Proceedings of Conference of North American Chapter of the Association for Computational Linguistics: Human Language Technologies,Jun. 12, 2016, pp. 260-270.

Li, et al., "Unsupervised Identification of Synonymous Query Intent Templates for Attribute Intents", In Proceedings of 22nd ACM International Conference on Information and Knowledge Management, Oct. 27, 2013, 10 Pages.

Nadeau, et al., "Unsupervised Named-Entity Recognition: Generating Gazetteers and Resolving Ambiguity", In Proceedings of 19th international Conference on Advances in Artificial Intelligence: Canadian Society for Computational Studies of Intelligence, Jun. 7, 2006, 12 Pages.

Pantel, et al., "Mining Entity Types from Query Logs via User Intent Modeling", In Proceedings of the 50th Annual Meeting of the Association for Computational Linguistics, Jul. 8, 2012, pp. 563-571.

Xu, et al., "Named Entity Mining from Click-Through Data Using Weakly Supervised Latent Dirichlet Allocation", In Proceedings of the 15th ACM SIGKDD International Conference on Knowledge Discovery and Data Mining, Jun. 28, 2009, pp. 1365-1373.

* cited by examiner

UNSUPERVISED ENTITY AND INTENT IDENTIFICATION FOR IMPROVED SEARCH QUERY RELEVANCE

FIELD

The present disclosure relates generally to the field of computing and communications, and in particular but not exclusively, relates to unsupervised entity and intent identification in search queries for improved search query relevance on online search engines accessed over computer communication networks.

SUMMARY

A system and method for unsupervised entity and intent identification in search queries for improved search query relevance are described that use an online query collection subsystem to capture and evaluate user search queries submitted to a search engine (e.g., Bing, Google, Yahoo, etc.) to identify words within each query that are or that represent "entity" words or "intent" words. One key objective of the system and method is to identify and extract such entity and intent words as a means to identify previously received user search queries (i.e., past user queries) that include the same or semantically similar entity or intent words. Once identified in the set of past user queries, these queries are retrieved from a search log accessed by the query collection subsystem and displayed as alternative query suggestions in relevance rank order manner on the user interface of the device used to submit the search query to the search engine.

In determining what past user search queries are related to a received search query executed on a search engine, the words in the search engine results pages ("SERPs") retrieved from execution of the search query on the search engine are parsed while a process is concurrently executed that identifies, extracts and retrieves web addresses (i.e., universal resource locators or "URLs") and document titles in the SERPs. The words in the SERPs that are present in top level domain names in the web addresses or in document titles are initially extracted and compiled in a list of "entity" words. These entity words are further processed to determine whether each entity word is also present in the received search query. In addition, the frequency of occurrence and the historical number of clicks received on each entity word identified in the collection of search engine results pages over a rolling time window of collected queries are determined. Collectively, the presence of an entity word, its frequency of occurrence and the historical click count on the entity word are used to compute a probability relevance score that is compared to a quantitative "entity" word threshold level. Entity words with probability scores greater than this threshold level are deemed to be "relevant" and are subsequently used as higher priority terms when the search log is used to identify and retrieve past user queries with the same or similar relevance scores.

The system and method disclosed herein is used to perform a similar process to determine which words in a current search query are intent words and, from among those words, which are "relevant" intent words. A list of URLs is retrieved from the SERPs generated from execution of a search by a search engine using the received search query. Additionally, each word of the search query is parsed by the query collection subsystem and compared to the URLs in the SERP results. The SERP words located in the URLs are added to a list of identified intent words which are then further evaluated to determine which of the identified intent words are "relevant" intent words to be assigned a probability score indicative of intent relevance. As with entity words, an intent word is deemed relevant if and only if its computed probability relevance score exceeds a quantitative intent threshold level, which level differs from the quantitative entity level described earlier.

Once computed, the individual word probability scores are then used as relative weights to identify past user searches stored in the search log with the same or similar quantitative probability profiles. The quantitative scores in turn are used to rank in relative order of relevance the various past user searches which are then retrieved, rank-ordered and displayed to search engine users as suggested queries. Such suggested queries can be generated in an entirely unsupervised manner requiring no prior labeling of data or words and can be generated from completely unstructured user input (i.e., search queries) ranging from short phrases to grammatically incorrect phrases or sentences.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BACKGROUND

The rapid pace of development of search engine technologies has created opportunities to provide enhanced services to users seeking information from sources that are accessible online. The primary means of seeking information is with the use online search engines such as those found on Bing.com, Google.com and Yahoo.com, among other lesser known alternatives. In addition, the emergence of embedded search engines with online services and social media platforms, such as Facebook®, has created an accelerating demand for high-speed, accurate and precise search capabilities. Indeed, the plethora of information available online has created a growing demand for online assistants that can aid users in rapidly refining their searches while preserving the relevance of search queries in efforts to identify online resources such as documents, videos, images, live and recorded audio content, etc. that may be even more relevant to their search queries than the search results that might otherwise be generated without such rapid refinements.

The dynamic generation of such search query refinements ultimately requires some degree of understanding of a user's intent. In many cases, a user's actual intent may be represented in one or a few words in a multiple word query (e.g., celebrity name, brand, service, product or an action, etc.). However, few online search systems are equipped to effectively determine a user's intent without some prior knowledge. And, the acquisition of that prior knowledge often entails prior labeling of certain words or terms, limiting the semantic scope of a query to specific subject matter, or forcing a user to provide more detail in a search query so that a more structured description of the intent of the search is made more evident. Indeed, among currently used options for refining a search query, including auto-suggest and related-search capabilities, at least three major problems exist in attempts to understand a user's intent from search queries as they are frequently presented online. These problems include the lack of available labeled data to help deduce a user's intent, the lack of structured data when presented in queries since they are often typed by users with little to no regard for the formal rules of grammar, and the sparseness of data in queries which makes it difficult or impossible for an online system to learn patterns in the use of words in queries in a wholly unsupervised manner.

Thus, there is a significant and growing need for a robust system and method for improving search query relevance using an unsupervised approach to rapidly identify intent or entity words in search queries and to use such words to identify and retrieve prior relevant search queries and to display them in a relevance-ranked order as alternative query suggestions for current users of search engines.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
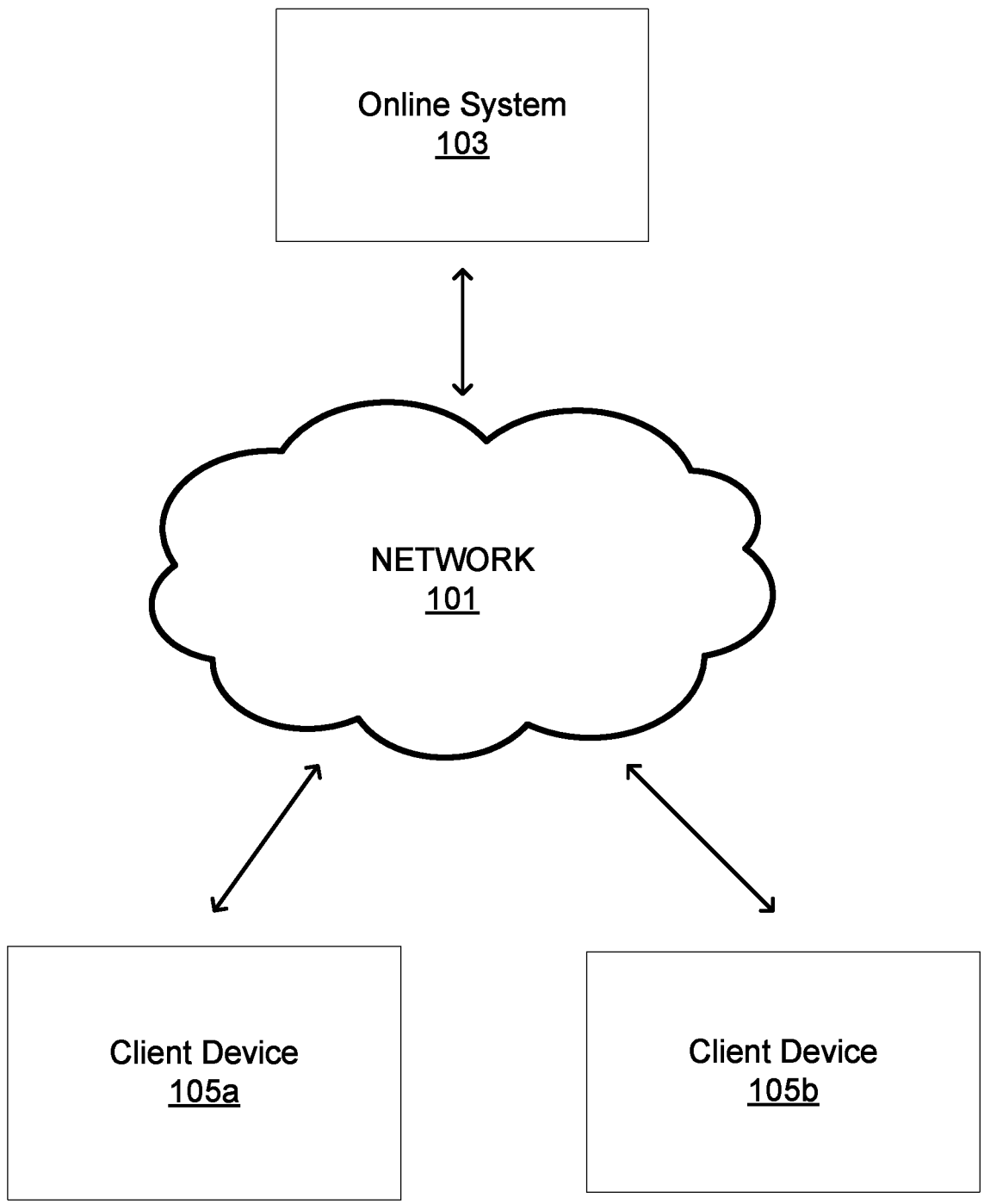
FIG. 1 is a block diagram illustrating an operating environment of a system providing improved search query relevance in an embodiment.

The example embodiments below concern a system and method for unsupervised entity and intent identification for improved search query relevance. The examples described below allow users to enter a free-form search query on a search engine, generate search result pages relating to the subject matter of the search query and to receive a relevance rank-ordered list of query suggestions based on certain entity or intent words in a user's search query that are the same or similar to entity or intent words in past user search queries. Relevance is determined from a degree of similarity in entity or intent words between a user's current search query and the past user search queries stored in an aggregated search log. Past search queries having the highest level of relevant similarity are ranked more highly in the rank-ordered list of query suggestions retrieved from the search log which is dynamically updated over an adjustable tracking period.

The technical effect of the embodiments described below concerns the determination and retrieval of past search queries in an unsupervised manner that are relevant to a user's actual intent in a current search query provided to a search engine. Collectively, these embodiments result in the timely identification and retrieval of past user search queries that are more relevant to the subject matter of a current user search query when compared to current alternatives such as auto-suggest features or other contemporary related-search capabilities.

As described more fully below, an example computing system determines a set of query suggestions related to a user's search query based on an identification and evaluation of important words in the search engine results pages and the received user search query. These so-called important words are entity words or intent words. In determining whether words are entity or intent words, the system parses the search engine results pages produced from execution of a received search query on a search engine and proceeds initially to identify parsed words that appear in top level domain names and in document titles of the search engine results pages related to a received search query. The parsed words appearing in either a top level domain name, document title, or both are categorized as entity or intent words. Afterwards, the system proceeds further to determine the frequency of occurrence of the entity words or intent words and then determines whether any of these words appear in the received search query. The parsed words appearing in either the top level domain names or the document titles with significant levels of historical click counts and which are also in the received search query with a sufficiently highly frequency of occurrence are categorized as "relevant" entity words or intent words based on two separately computed probability relevance scores, one being an entity word relevance score and the other being an intent word relevance score. Once categorized, the system proceeds to identify past user search queries stored in or accessible through an aggregated search log that have the same or similar relevance scores as the entity or intent words related to the received search query. The past user queries having the same or similar relevance scores as the computed probability relevance scores as the received search query are retrieved and displayed on the user interface of a client device in relevance rank-order as query suggestions related to the received search query.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are examples and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

FIG. 1 is a block diagram illustrating an exemplary embodiment 100 of a system and method unsupervised entity and intent identification for improved search query relevance. The environment 100 includes an online system 103 and client devices 105a and 105b connected via a network 101. Although a select number of each device are shown in FIG. 1, embodiments can have more or fewer of each device (e.g., additional client devices 105, etc.).

The online system 103 is comprised of interoperating computer hardware resources and computer software subsystems that provide query collection and query relevance ranking services to users. In one embodiment, the online system 103 includes a query database, an entity subsystem, an intent subsystem and interoperating modules for the identification and ranking of relevant past user search queries that relate to a newly received user search query. The online system 103 collects each new user query, retrieves the search engine results pages related to the query and performs a parsing of words in both the query and the search engine results pages to identify intent words or entity words. The database provided in the online system 103 includes not only a running log of past user queries, but also a log of the click count activity on the words of the search engine results pages related to each past user query. The online system 103 combines the data provided from the parsed words, historical click counts on the parsed words, and the absolute and relative frequencies of occurrence of the parsed words to identify entity words or intent words which are then scored, relevance-ranked and used to retrieve past user queries with the same or similar relevance scores as those computed from the word parsing of queries and search engine results pages. The past user queries having relevance scores greater than a predetermined threshold level for either entity or intent words are then transmitted by the online system 103 for display on a user interface of a client device 105.

A client device 105a, 105b is a device used by a user to communicate with the online system 103. A client device 105a, 105b may be, for example, a desktop computer, laptop, smart phone, tablet computer, or personal digital assistant (PDA). A user communicates with the online system 103 through a client device 105a, 105b to use the query collection subsystem in the online system 103. In response to executing a search query provided from a client device 105a, 105b, the query collection subsystem stores the query, parses the words of the search engine results pages generated using a search engine, determines relevant entity words and relevant intent words related to the query and the search engine results pages, and retrieves one or more relevant past user search queries from a database accessed by the query collection subsystem of the online system 103. Relevant past user queries are ranked-ordered by the query collection subsystem and then transmitted and displayed on a user interface of a client device 105a, 105b in relevance rank-order.

The network 101 represents the computer-communication pathways between the online system 103 and the client devices 105a, 105b. In one embodiment, the network 101 is the Internet and uses standard communications technologies and/or protocols. The network 101 can include links using technologies such as Ethernet 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 101 can include multiprotocol label switching (MPLS), the transmission control protocol/Internet protocol (TCP/IP), the User Datagram Protocol (UCP), the hypertext transport protocol (HTTP), the simple mail transfer protocol (SMTP), the file transfer protocol (FTP), and other competing alternatives.

The data exchanged over the network 101 can be represented using technologies and formats such as the hypertext markup language (HTML), the extensible markup language (XML), etc. In addition, all or some links can be encrypted using conventional encryption technologies such as secure sockets layer (SSL), transport layer security (TLS), virtual private networks (VPNs), Internet Protocol security (IPsec), etc. In alternative embodiments, data communication can occur using custom and/or dedicated data communications technologies instead of, or in addition to, those described above.

Figure 2:
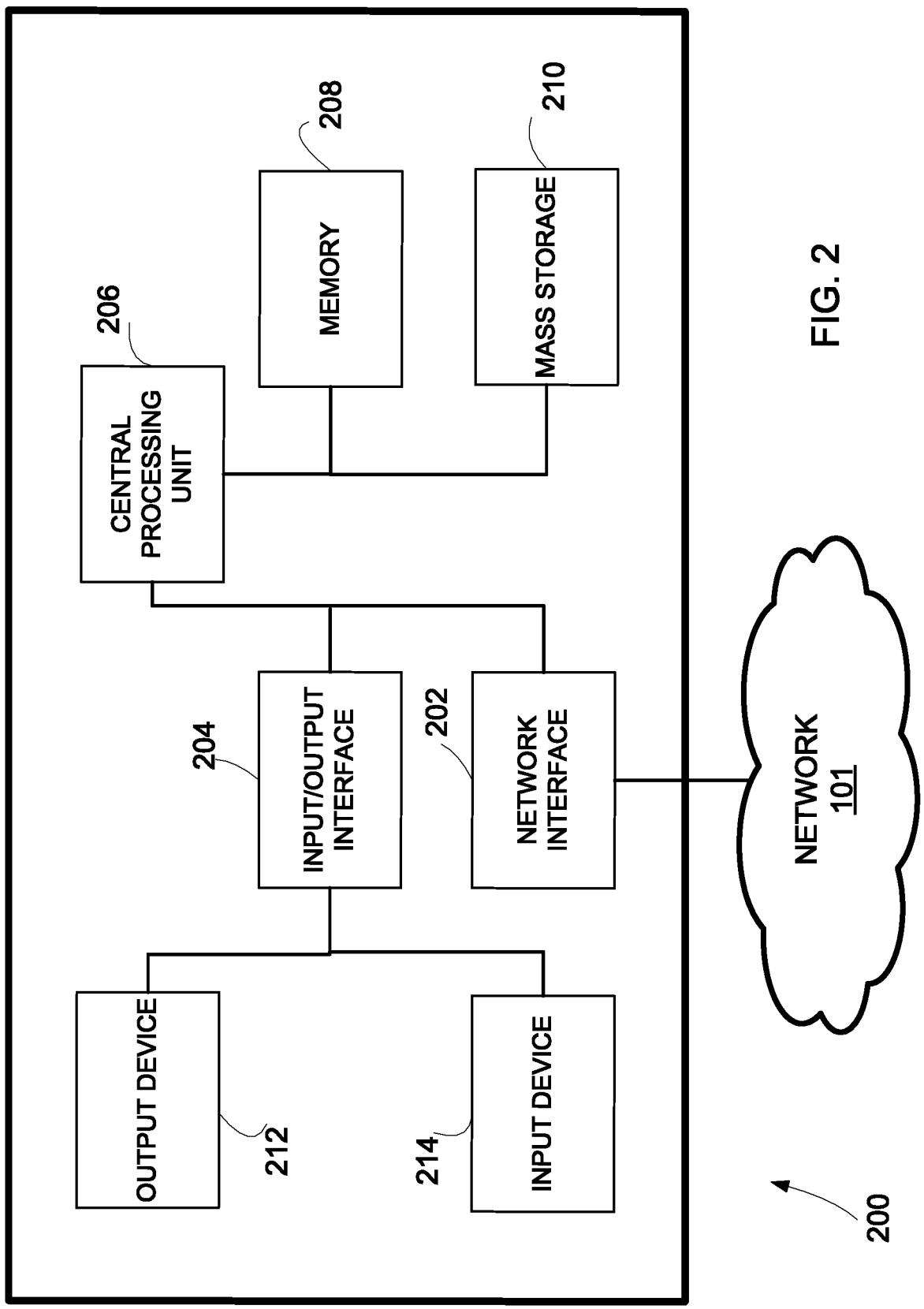
FIG. 2 is a block diagram illustrating an embodiment of a client device used with a system for providing improved search query relevance.

FIG. 2 is a block diagram illustrating the operative components in an embodiment of a client device 200 used with the online system 103. In practice and as previously described, a client device 200 can be a desktop computer, laptop, smart phone, tablet computer, personal digital assistant (PDA), or other device suitable for entry of search queries and review of query suggestions by a human user. It is important to note, however, the entry of search queries from a client device 200 is not limited solely to human users. Search queries can be entered using automated bots or other remote or distributed computing intelligence enabled in substantial part from machine learning and deep learning methods and systems. Thus, it is anticipated that the submission of search queries and the interpretation of query suggestions can be performed using such automated bots and/or distributed intelligent systems for the purposes of identifying and executing the most relevant searches based on extracted entity words and intent words.

In the illustrated embodiment, the client device 200 is coupled to a network 101 over which data is received and transmitted from and to an online system 103. In practice, multiple client devices 200 can be used to send and receive data to and from the online system 103 for the identification and retrieval of relevant query suggestions from past user search queries. Data from the network 101 is received on network interface 202 and placed in queue for retrieval by a central processing unit 206. In this embodiment, the central processing unit 206 can be a general purpose computer or an application specific integrated circuit (ASIC), or computing architecture suitable for the use and/or processing of strings, lists or other data structures suitable for maintaining relative relationships between data items. The data presented in one embodiment is the rank-order list of query suggestions received from the online system 103 in response to a user's submission of a search query from the client device 200. In transmitting a search query to the online system 103, user input such as a search query is provided using an input device 214 (e.g., a monitor, a touch screen display, etc.) and is subsequently received on the input/output interface 204 for queuing and transmission using the central processing unit 206 over the network interface 202 to the online system 103. In an embodiment, query suggestions transmitted from the online system 103 as a list or other data structure preserving relative relationships among data items (e.g., a ring, a stack, a B+ tree, etc.) are received on the network interface 202 and stored in either program memory 208 (e.g., RAM, DRAM, SRAM, NVRAM, SDRAM, DDRX RAM, etc.) or on a mass storage device 210 (e.g., a hard disk drive, floppy disk, CD-ROM, magnetic tape, magnetic disk, magnetic drum, etc.) for retrieval by the central processing unit 206 and display on an output device 212 (e.g., a monitor, flat panel display, refreshable Braille display, etc.) as an ordered list for end-user review and selection.

Figure 3A:
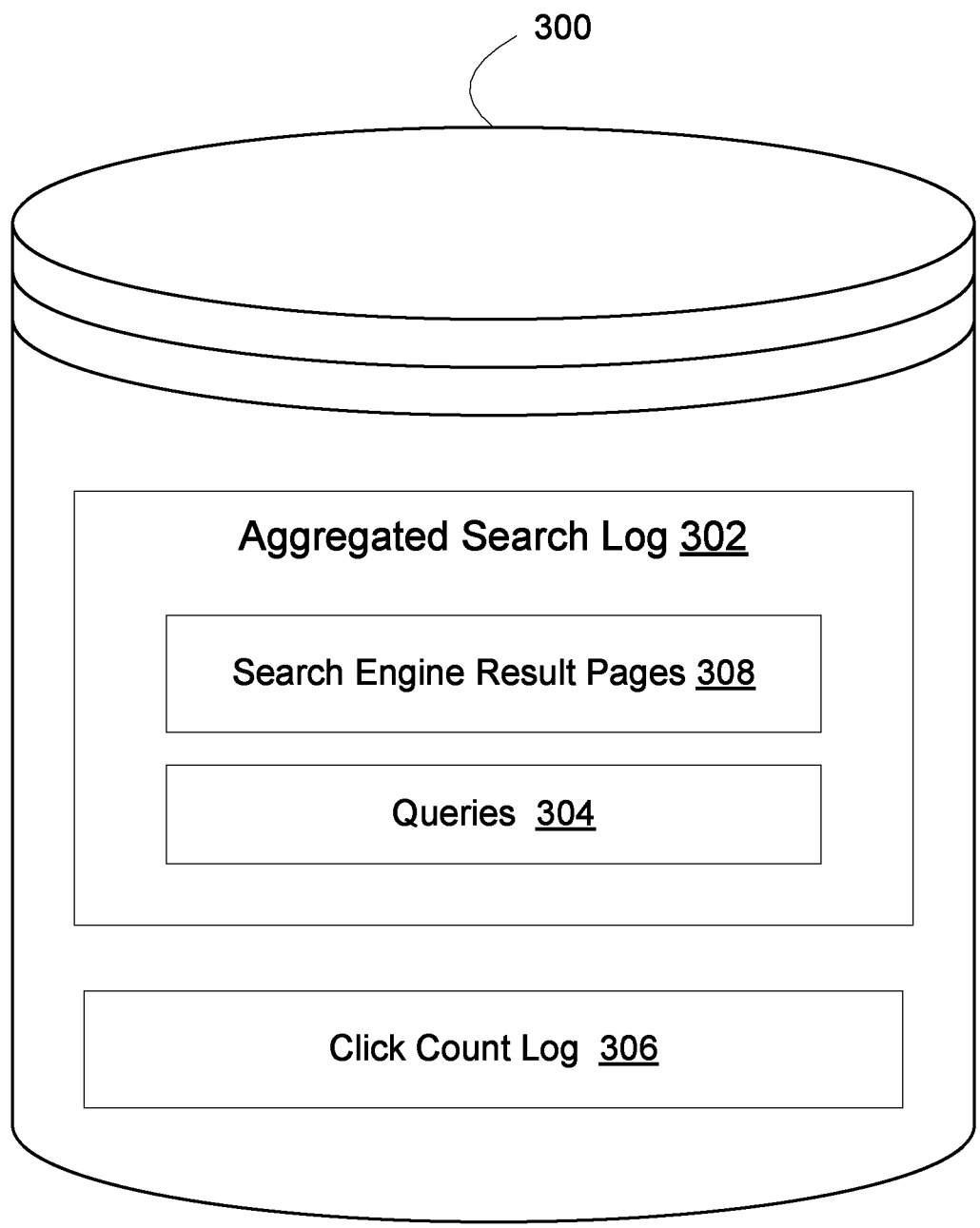
FIG. 3A is an illustration of a query database in a system for improved search query relevance in an embodiment.

FIG. 3A is an illustration of a query database of a query collection subsystem in an online system 103 in an embodiment. In the illustrated embodiment, the query database 300 is comprised of a single database, or in alternative embodiments, multiple distributed databases. The query database 300 stores an aggregated search log 302 and a click count log 306. The aggregated search log 302 can be implemented as a lookup table or an indexed table, such as a hash table, or other suitable data structure for storing both user search queries 304 and related search engine result pages 308 (interchangeably referred to as SERPs). In an embodiment, the stored search engine result pages 308 are the search results produced from the execution of search queries over an adjustable tracking period which in the illustrated embodiment is a trailing 12-month tracking window. In addition to the search results, the user search queries 304 are also preserved and stored over the adjustable tracking period. The queries 304 include search queries from users searching for information on various topics on a search engine (e.g., Bing.com, Yahoo.com, etc.) and they are stored for the purpose of tracking user activity and for providing a repository of prior search activity that can be used to identify suitable query suggestions for subsequently received user search queries which may be relevant to the subject matter of these subsequently received search queries.

The repository of stored search queries 304 includes single word and multiple word search queries, each of which generates search engine result pages 308 upon execution by a search engine. The search results can include documents, images, videos, or other content of direct or indirect relevance to the subject matter of each search query in the list of stored queries 304. In addition to the aggregated search log 302, the query database 300 includes a click count log 306 that maintains a running log of user clicks on the accumulated set of search engine result pages 308 stored in the aggregated search log 302 over the extent of an adjustable tracking period. In one embodiment, the click count log 306 is a running historical click count log reflecting user activity, specifically user click activity, on search results appearing in the search engine result pages 308 and relating to the queries 304 stored in the aggregated search log 302. This click count is implemented in an embodiment as an extension of the aggregated search log 302 in separately identifiable fields and records maintained within the same indexed table or, in an alternative embodiment, as a separately maintained but concurrently updated associative table that preserves the logical relationships between click count activity and associated search query.

Figure 3B:
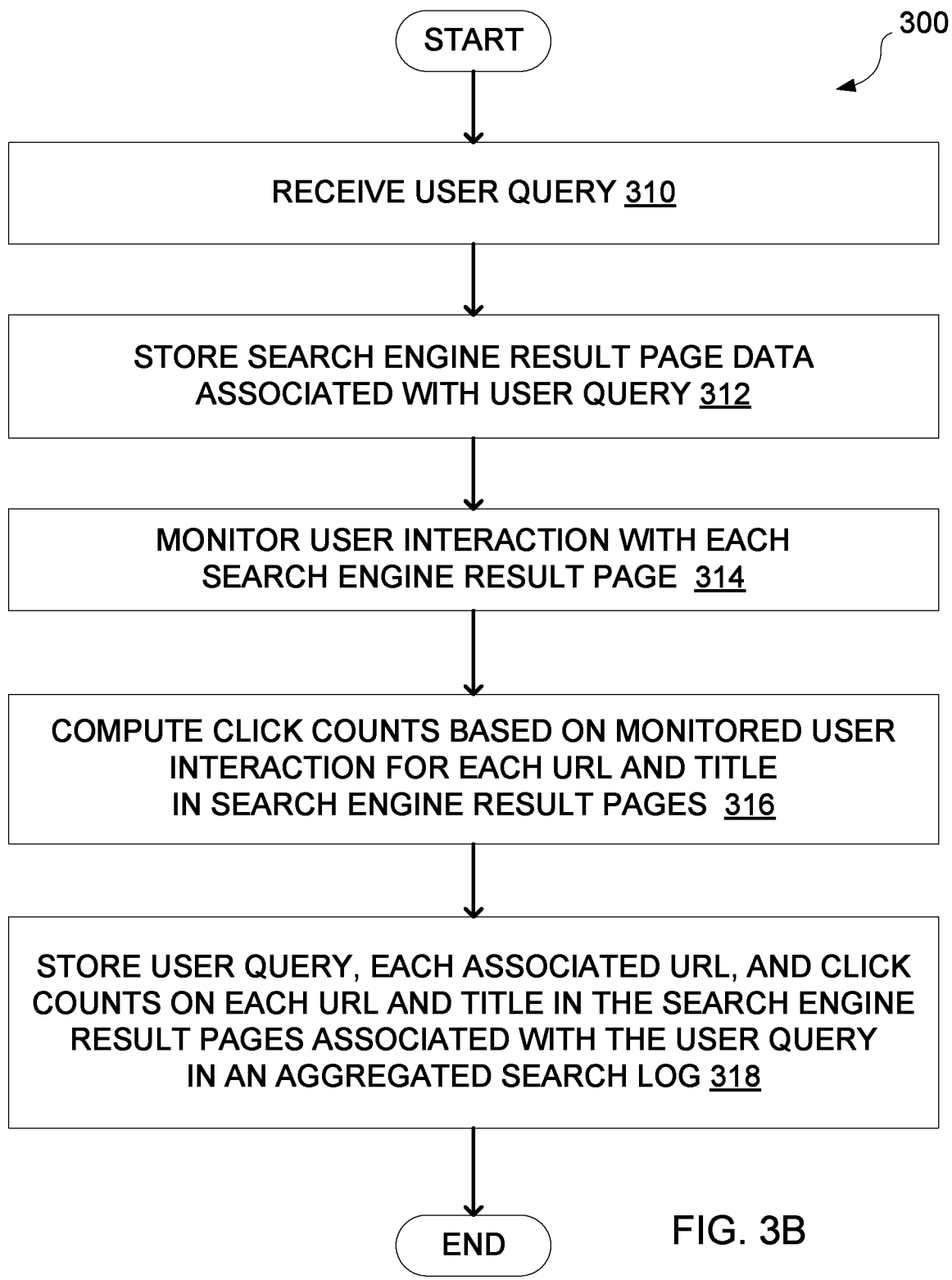
FIG. 3B is a flowchart illustrating an embodiment of a method for storing search queries and search result data for improved search query relevance.

FIG. 3B is a flow chart illustrating an embodiment of a process 300 for capturing, storing, and maintaining search queries and related search engine results pages in the query database 300. Upon receipt of a user search query, as shown at step 310, the SERPs generated from execution of the search query on a search engine are stored in an aggregated search log, as shown at step 312. A click tracking tool embedded on web pages served as SERPs by a search engine in response to the execution of search queries enables the monitoring of click-through activity on different search engine result pages, as shown at step 314, and the results produced using this tool enables the compilation and storage of click counts on the search engine result pages associated with any search query. In particular, this process performs a continuous computation and determination of click counts on the Universal Resource Locators ("URLs") and document titles retrieved as search results with the SERPs, as shown at step 316. The search query, each of its associated universal resource locators, and the click counts on each of the URLs and document titles in the SERPs are in turn stored in the query database 300 in the aggregated search log 302, as shown at step 318. The aggregate search log 302, in one embodiment, is an indexed table that stores each query, associated SERPs and the click counts on URLs and document titles in the associated SERPs over the course of an adjustable tracking period. In particular, in an embodiment, the indexed table is a hash table including a hash tag that marks or identifies each query in a hash table. Separately, a query collection subsystem in the online system 103 performs continuous event-driven or real-time updating and refreshing of the data and references in the indexed table such that there are saved queries, SERPs and click count records for the URLs and document titles in the search results stored over the course of an adjustable tracking period.

Figure 4:
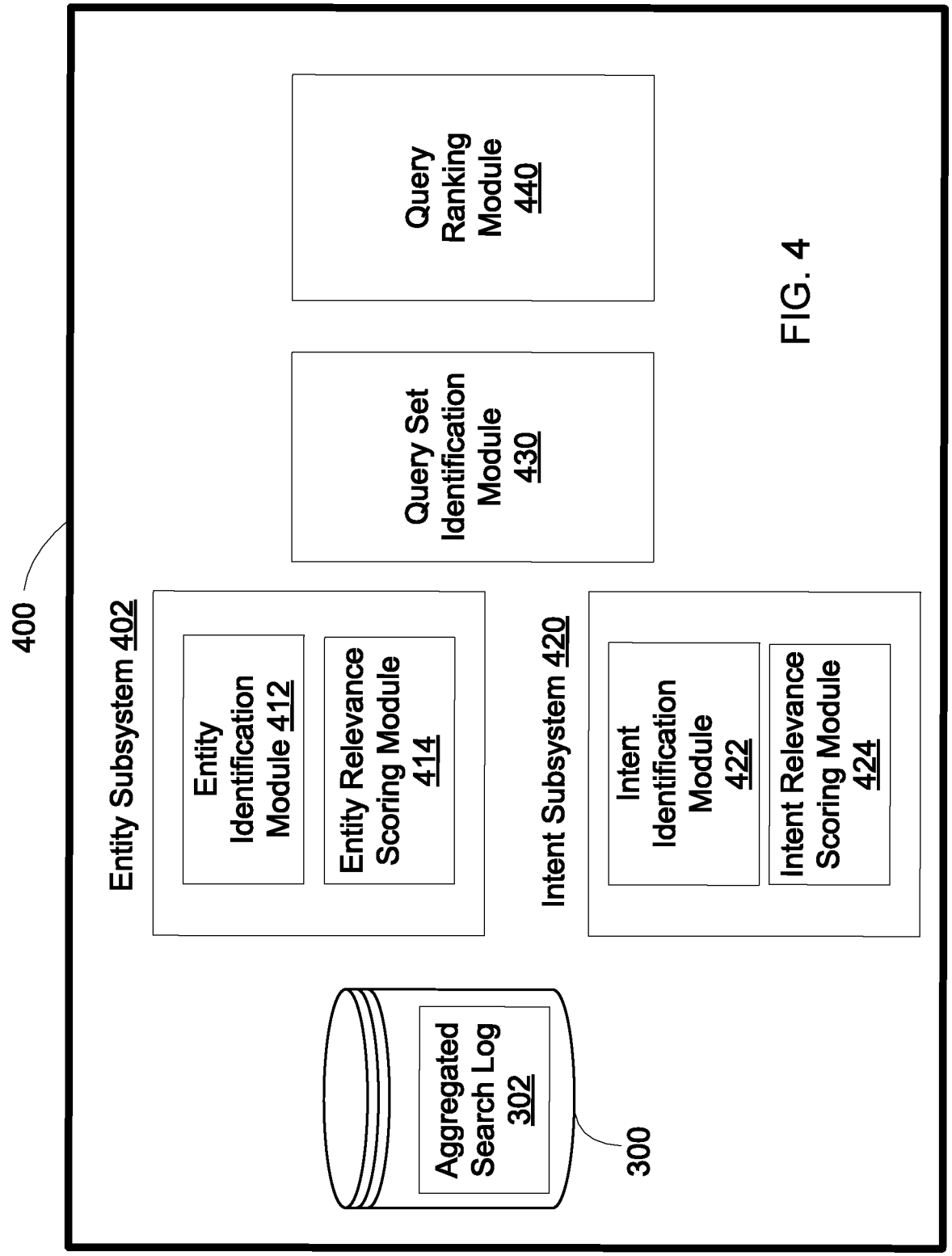
FIG. 4 is an illustration of a system for improved search query relevance in an embodiment.

FIG. 4 illustrates an embodiment of the operative components of a query collection subsystem 400 in an online system 103. As illustrated, the subsystem 400 includes a query database 300 in which an aggregated search log 302 and a click count log 306 (not shown) are stored. In an embodiment, the data stored in the query database 300 is accessed by an entity subsystem 402 and an intent subsystem 420. The entity subsystem 402 in this embodiment is comprised of two interoperating modules, an entity identification module 412, and an entity relevance scoring module 414. In the depicted embodiment, the entity identification module 412 identifies "entity" words and performs word parsing on search engine result pages associated with each received search query. The identification module 412 also performs a related process on the SERPs associated with a search query to identify top level domain names, referred to as "Domain-URLs," and each document title associated with an identified Domain-URL, referred to as a "Domain-Title." In an embodiment, the entity relevance scoring module 414 determines the relevance of each word identified using the entity identification module 412. And, in particular, the entity relevance scoring module determines whether an identified word is an "entity" or "intent" word, confirms from word parsing whether such words appear in a received user search query and, if so, determines the frequency of occurrence of such words across the set of stored search engine results page in an aggregated search log and the number of clicks received on URLs and document titles including such words across the collective set including the user query and the associated search engine result pages. In this manner, entity words or intent words with high frequencies of occurrence and high click counts on the related URLs and document titles in the search engine results pages determine whether such entity or intent words are "relevant." A word is determined to be "relevant" quantitatively based on the computation of an posteriori probability distribution function relating the presence or absence of a word in a search query and in search engine results pages in the accumulated set of stored search results extending over an adjustable tracking period. Once computed, the probability value produced from the application of the probability distribution function to the applicable set of data is compared to a quantitative threshold, one threshold for "entity word" determination and a different threshold for "intent word" determination. Computed probability values greater than an entity threshold level are categorized as "relevant" entity words while intent words having a probability distribution value greater than the intent threshold level are categorized as "relevant" intent words. A word in a search query is considered an "entity" word if it represents the object of or the context for an action represented by an intent word. An "intent" word represents an action that a user seeks to do to, for or with the object that is the entity. The quantitative entity threshold level is updated on at a least a semi-annual period based on continuous manual reviews of computed probability relevance scores for entity words in the SERPs and the user queries received in this time period. During this six month period, each month a sample set of search queries, related query-suggestions, and computed entity-word relevance scores are compiled into query-suggestion triplets (query, suggestion, relevance score). For each triplet, the query-suggestion pair ("qs-pair") is manually reviewed and judged to be either "good" or "bad" depending on relevance score. A new threshold is chosen on a pre-determined time period (in this example, every six months) based on such judgments so that the maximum number of lower scoring qs-pairs are eliminated. Thus, as a threshold level increases, the number of lower scoring bad qs-pairs affecting the threshold decreases.

Generally, a search query provided on a search engine is often a request for information on a particular topic. This topic can also be comprised multiple related sub-topics that may be of interest to a user who has provided the search query. In performing a search using a particular search query, a user may seek to reformulate or refine the query to obtain search results relating to one or more of the sub-topics. Therefore, in assisting a user with the task of reformulating or refining a search query, it is important to understand the user's implicit intent determined as best as possible from the words provided in an initial search query. If user intent can be determined efficiently from the words used in the initial search query, semantically similar or related search queries from contemporaneous or previously provided search queries can be readily identified and presented as alternative search query suggestions.

Conceptually, each topic in a search query includes words that can be assigned different relevance weights. Related topics may have words in common while unrelated topics may have words that are not commonly shared. For example, search queries on a topic such as "sport," are more likely to have more words in common than search queries on an entirely unrelated topic such as "politics." And, for each topic, each word is likely to have different relevance weight or vastly different frequencies of occurrence based on their respective relevance to the topic of a search query. Based on this underlying assumption, for a given topic in a search query, the topic itself will influence the number and relevance of the words used in the search query. In this manner, words in a search query that are more relevant to a topic, and thus more strongly associated with the topic and more representative of the core of the search query, are likely to be more important and this importance is reflected in the relative number of occurrences of a word in a query and the number times users click on a query including words that are more related to the core of the search query.

The relationship between a search query topic and the words used in the search query and its SERPs can be represented as a word distribution capable of modeling using a multinomial distribution. In an embodiment, a compound probability distribution referred to as the Dirichlet-multinomial distribution is used to represent or model the distribution of words present in a search query and its SERPs based on the topic of the query. This form of probability distribution assigns weight to each word in a query and its SERPs based on its association (i.e., frequency of word occurrence) with the topic. In one embodiment, a query is the topic and the words in the SERPs are used to measure the frequency of occurrence of certain important words referred to as entity words and intent words. Two different but related models are used to determine the relevance weights for entity words and intent words as illustrated below.

Assume for each search query Q, K different algorithmic results have been shown historically in the past twelve (12) months on SERPs. Each of the K algorithmic results contains a URL, a Document Title and a Document Description. Furthermore, assume that the URL is a Domain-URL (as described above) and that a Document Title is associated with each such Domain-URL and referred to as a Domain-Title (as described previously). Assume there is a probability distribution of words associated with each search query Q. Let $P^Q$ be the probability distribution associated with search query Q on word $w_i$ and where α is the number of times each word $w_i$ appears in a list of unique URLs and associated document titles. If it is assumed that $P^Q$ can be described as following a Dirichlet probability distribution, then:

$$P^Q = \frac{1}{B(\alpha)} \prod_{i=1}^{K} p_{w_i}^{\alpha_i - 1}$$

Where $$B(\alpha) = \frac{\prod_{i=1}^{K} \Gamma(\alpha_i)}{\Gamma\left(\sum_{i=1}^{K} \alpha_i\right)},$$

$\alpha=(\alpha_1, \ldots, \alpha_K)$, and $p_{wi}$ is the probability of word $w_i$. In this context, the probability $P^Q$ is the a priori probability distribution of words corresponding to search query Q.

In addition to determining the form of probability distribution to be applied to words in a search query Q, historical click-through data must considered to further refine a likelihood or probability of each word $w_i$ given search query Q. This likelihood is used in conjunction with the probability distribution $P^Q$ in determining an adjusted probability $p_w$ of word $w_i$. In this instance, $p_w$ is the probability relevance score for the word $w_i$ being an entity word. More specifically, the expression used to calculate the likelihood of iv, being an entity word based on historical click data is:

$$\propto \prod_{i=1}^{N} p_{w_i}^{c_{j_1}^i + c_{j_2}^i + \ldots + c_{j_m}^i}$$

Where N is the total number of words, $w_i$ is the $i^{th}$ word and $c_{j_1}^i$ is the click count for the $j_1^{th}$ Domain-URL and Domain-Title containing word $w_i$. If it is assumed that there are m different URLs which contain $w_i$ then the total number of clicks corresponding to $w_i$ is $c_{j_1}^i + c_{j_2}^i + \ldots + c_{j_m}^i$. With a priori probability $P_0^Q$ the likelihood of a word can be expressed as:

$$L(\underline{p} \mid \underline{c}, \alpha) = C * \prod_{i=1}^{N} p_{w_i}^{c_{j_1}^i + c_{j_2}^i + \ldots + c_{j_m}^i} * P^Q$$

Where C is constant, $\underline{p}=(p_{w_1}, p_{w_1}, \ldots, p_{w_N})$, $\underline{c}=(c_{j_1}^1, c_{j_2}^1, \ldots, c_{j_m}^1, c_{j_1}^2, \ldots, \ldots, c_{j_m}^N)$, the full expression becomes:

$$L(\underline{p} \mid \underline{c}, \alpha) = C * \frac{\prod_{i=1}^{K} \Gamma(\alpha_i)}{\Gamma\left(\sum_{i=1}^{K} \alpha_i\right)} * \prod_{i=1}^{N} p_{w_i}^{\alpha_i + c_{j_1}^i + c_{j_2}^i + \ldots + c_{j_m}^i - 1}$$

And, on optimizing $L(\underline{p}|\underline{c},\alpha)$ with respect to $p_w$'s, the probability relevance score for an entity word can be expressed as:

$$p_{w_i} = \frac{\alpha_i + c_{j_1}^i + c_{j_2}^i + \ldots + c_{j_m}^i}{\sum_{i=1}^{N} \alpha_i + c_{j_1}^i + c_{j_2}^i + \ldots + c_{j_m}^i}$$

The probability of an identified entity word being a "relevant" entity word requires that for a given $w_i$ for i=1 to N, based on a threshold $T_e$, if $p_w > T_e$ then $w_i$ is considered to be not only an entity word but more formally as a "relevant" entity word. Where there is more than one word satisfying this property, then the relative weight or "relevance" of each word is decided by probability relevance scores $p_w$. The threshold $T_e$ is universal and determined empirically but adjusted manually on a semi-annual basis based on identified entity words collected in search engine results pages and search queries over this time period.

In an embodiment, an intent subsystem 420 identifies the "intent" words in a search query. In this embodiment, the Intent Identification Module 422 identifies a word in a search query as an intent word if the word is present in the user query and in a set of URLs associated with the search query. The Identification Module 422 identifies an intent word as a "relevant" intent word if a ratio comparing (i) the number of times a word occurs in associated URLs and the search query to (ii) the number of times each word in the user query occurs in the user query and the list of associated URLs is greater than a predetermined intent threshold level. The intent threshold level is determined from periodic manual reviews of probability relevance scores computed over SERPs and received search queries which occur no less frequently than every six months. In this time period, each month a sample set of search queries, related query-suggestions, and computed intent-word relevance scores are compiled into query-suggestion triplets (query, suggestion, relevance score). For each triplet, the query-suggestion pair ("qs-pair") is manually reviewed and judged to be either "good" or "bad" depending on relevance score. A new threshold is chosen on a selected time period (in this example, six months) based on such judgments so that the maximum number of lower scoring qs-pairs are eliminated. Thus, as a threshold level increases, the number of lower scoring bad qs-pairs affecting the threshold decreases. Quantitatively, the relationship among the various variables used in determining the probability of a word being an intent word is shown below:

$$l(q \mid n, Q) \propto \prod_{i=1}^{N} q_{w_i}^{n_i}$$

Where $n_i$ is the number of times word $w_i$ appears in all URLs and the received search query and $q_W$ is the probability of $w_i$ being an important (or "relevant") intent word. Upon optimization, this relationship becomes:

$$q_{w_i} = \frac{n_i}{\sum n_i}$$

In one embodiment, the Intent Relevance Scoring Module 424 establishes the quantitative relevance of intent words in received search queries by comparing identified intent words to an empirical threshold level. For a given intent threshold, $T_1$, and $p_w$, $q_w$ can be considered as relevant "intent" words in the search query if these values are greater than the intent threshold. As described previously with respect to $T_e$, the intent threshold $T_I$ is determined empirically and adjusted manually on at least a semi-annual basis based on the performance of the method on the search engine result pages and search queries received in this time period. Overall, the "relevance" of a word in a search query Q is determined from the combined probability relevance scores expressed as the pair ($p_w$, $q_w$) for each word in the search query.

In an embodiment, the query set identification module 430 identifies queries from the set of stored past user queries received over a trailing 12-month tracking window that include one or more of the relevant entity words and relevant intent words. In particular, module 430 identifies past queries having words with probability relevance values that are greater than the applicable quantitative entity threshold level or the quantitative intent threshold level such that a subset of the queries stored in the query database can be retrieved and itemized as potential query suggestions for a received user query. In one embodiment, a query ranking module 440 establishes a relevance rank order for each identified query identified and itemized by the query set identification module 430. The ranking module 440 determines a collective relevance rank for a stored query by first establishing the relevance rank of an identified entity word (or intent word) having the highest probability relevance score. In an embodiment, each query including this highest relevance score can be retrieved and then further sorted based on the relative relevance scores of each successive word in each query.

As an illustrative example of probability relevance score rank-ordering of query suggestions, assume a search query $Q_1$ is received in the form "A B C" where each letter is a word. If the probability relevance scores, $p_w$ and $q_w$, where the entity word relevance scores are A=0.7 and B=0.5 and the intent-word relevance score for C=0.2, then the query suggestions for $Q_1$ retrieved from the aggregated search log 302 using the query set identification module 430 may be: "A D E", "A C E", "A B C D", "B C X", "B D", "C N P" where each letter is a word. The query ranking module 440 would then proceed to reorder the chosen queries in the query set according to relevance rank-order, which in this illustrated example would be: "A B C D", "A C E", "A D E", "B C X", "B D", "C N P". The relevance rank-ordering is determined primarily, but not exclusively, from the computed relevance scores (both intent and entity) and if the word had a higher computed intent-word relevance score (i.e., greater than the illustrated entity-word relevance scores), then it would have caused a different rank-ordering to be produced based upon the computed relevance scores for words in the search query. Once a rank-ordering is determined, the relevance rank-ordered list is transmitted to a client device where the relevance rank-ordered list of query suggestions is displayed on a user interface of a client device or otherwise made available to an automated bot or other automated service or capability executed on the client device.

Figure 5:
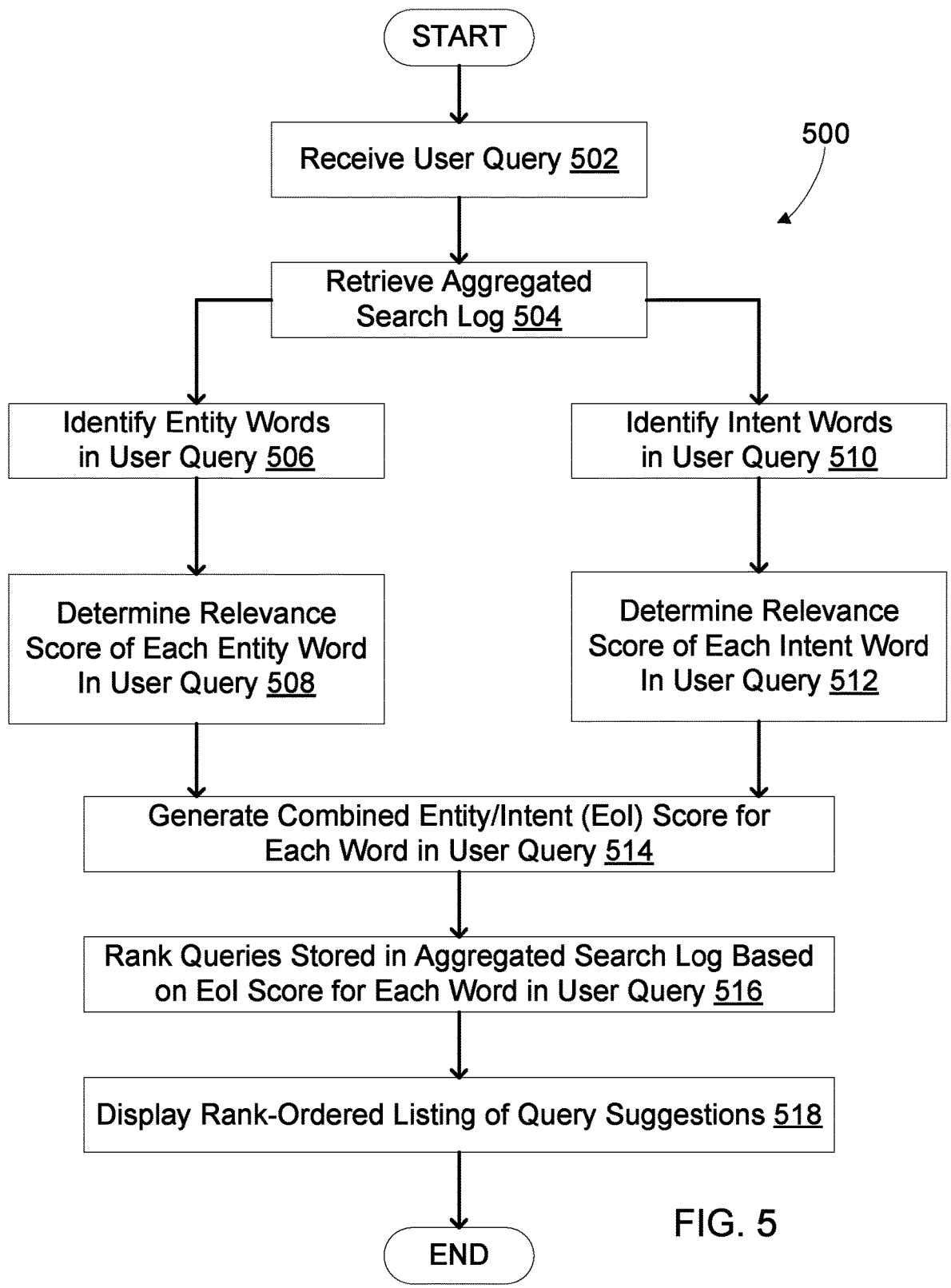
FIG. 5 is a flowchart illustrating an embodiment of a method for improved search query relevance.

FIG. 5 is a flow chart illustrating an embodiment of the operational flow of the query collection subsystem in an online system 103. The process 500 commences with the receiving of a user query, as shown at step 502, followed by the retrieval from an aggregated search log, step 504, and, in one embodiment, the concurrent execution of processes for the identification of certain words in the received user query as "entity words", as shown at step 506, or the identification of certain words identified in the received search query as "intent words," as shown at step 510. Once one or more entity words are identified from the parsing of words in both the search query and associated search engine result pages, a separate process is initiated to determine the relevance of each entity word involving the determination of an entity-word relevance score which is a value on a computed probability distribution, as shown at step 508. Likewise, a separate process is concurrently initiated and executed to determine an intent-word relevance score for each identified intent word, as shown at step 512. Each intent word, if present in a search query, is determined from the parsing and extraction of words in a received search query and its associated URLs. The parsed and extracted words which determined to be "intent words" are further processed to determine the frequency of occurrence of such words in the SERPs and search query and click count history of each word. Intent words or entity-words which collectively have probability relevance scores greater than certain preset threshold levels for intent-words or entity-words are deemed to be "relevant" intent-words or "relevant" entity-words. Once relevant entity-words and relevant intent-words are determined, a combined entity/intent relevance score is determined for each word in the search query, as shown at step 514, and this combined score is then used to retrieve and rank past queries stored in an aggregated search log that are identified as relevant query suggestions, as shown at step 516. The ranked list of past user queries according to their computed relevance to the relevant entity-words and relevant intent-words in a received search query is then transmitted to a client device for display as a rank-ordered listing of query suggestions. As discussed previously, the listing of relevant query suggestions is based not only on a determination of relevant entity-words or relevant intent-words, but also the frequency of occurrence of such words in the set of search engine result pages stored in an aggregated search log, the presence of the words in the received search query, and a determination of the number of historical clicks (i.e., click-through activity) on the search engine result pages stored in the aggregated search log and associated with the received search query and the past user search queries where such past search queries and result pages include the relevant entity-words or relevant intent-words such that the probability relevance scores for each query on the suggestion list exceeds a quantitative entity threshold level or a quantitative intent threshold level.

Figure 6A:
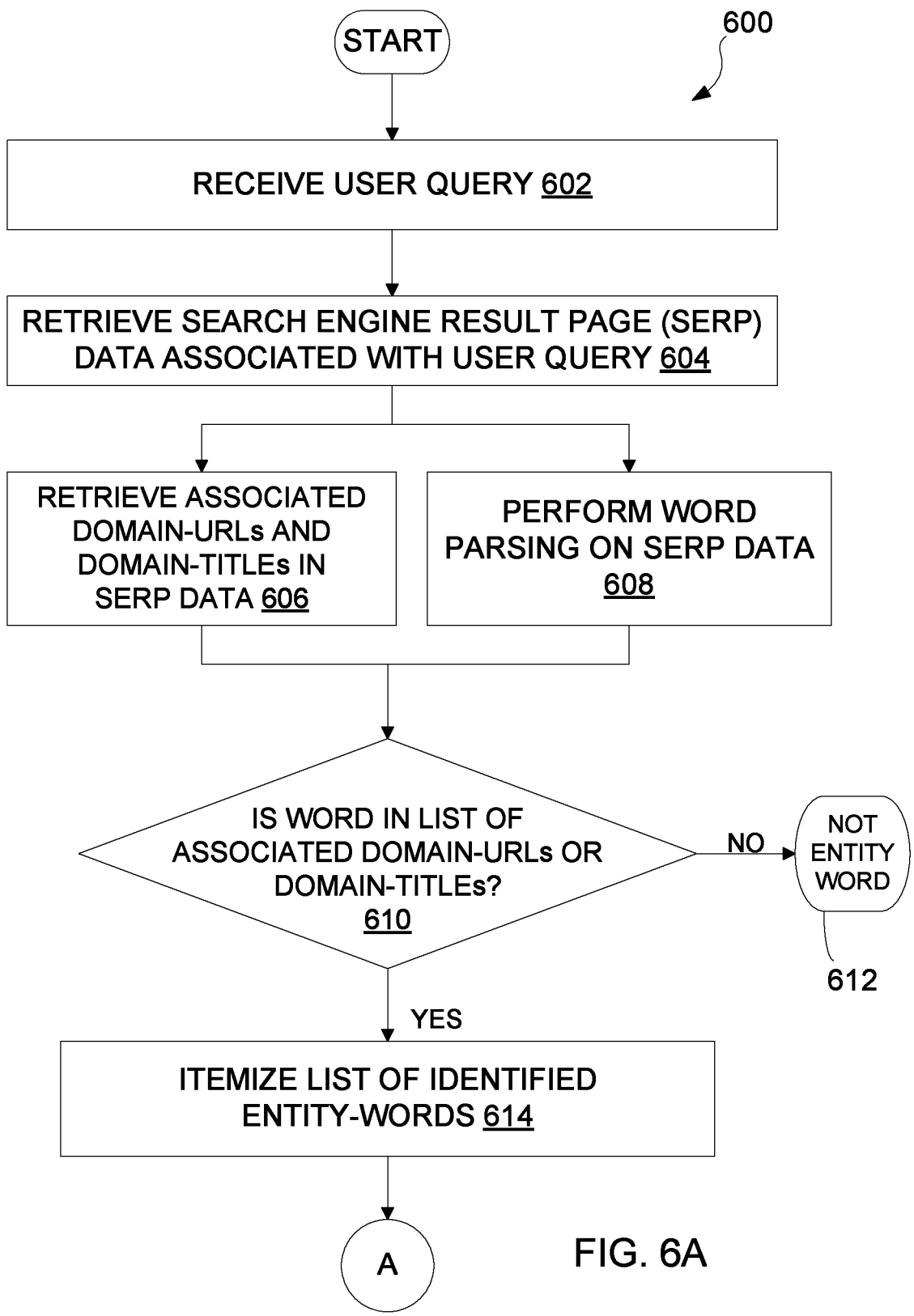
FIG. 6A is a flowchart illustrating an embodiment of a method for identifying entity words for improved search query relevance.

FIG. 6A is a flow chart illustrating an embodiment of a process for identifying entity words. This process 600 commences with the receipt of a user search query, as shown at step 602, followed by the retrieval of the search engine result pages associated with the search query, as shown at step 604. Both the search query and the associated search engine result pages are stored in an aggregated search log and are accessible by a query collection subsystem 400 for word parsing and for determination of associated frequency of occurrence and click count evaluations. This process 600 continues with the retrieval of associated Domain-URLs and Domain-Titles in the retrieved search engine result pages, as shown at step 602. Concurrent with the retrieval of such Domain-URLs and Domain-Titles is the parsing of words in the search engine results pages, as shown at step 608. The parsing of words in the search engine results pages is performed to identify and evaluate common words between the received search query and the full set of search engine results pages (including those produced from execution of the received search query on a search engine). Once word parsing is performed, each parsed word is compared to identified Domain-URLs and Domain-Titles, as shown at step 610. If a parsed word is in the associated Domain-URLs or Domain-Titles, then the word is added to an itemized list of identified entity words, as shown at step 614. In contrast, if the word is not in the associated Domain-URLs or Domain-Titles, then it is deemed not to be an entity word, as shown at step 612.

Figure 6B:
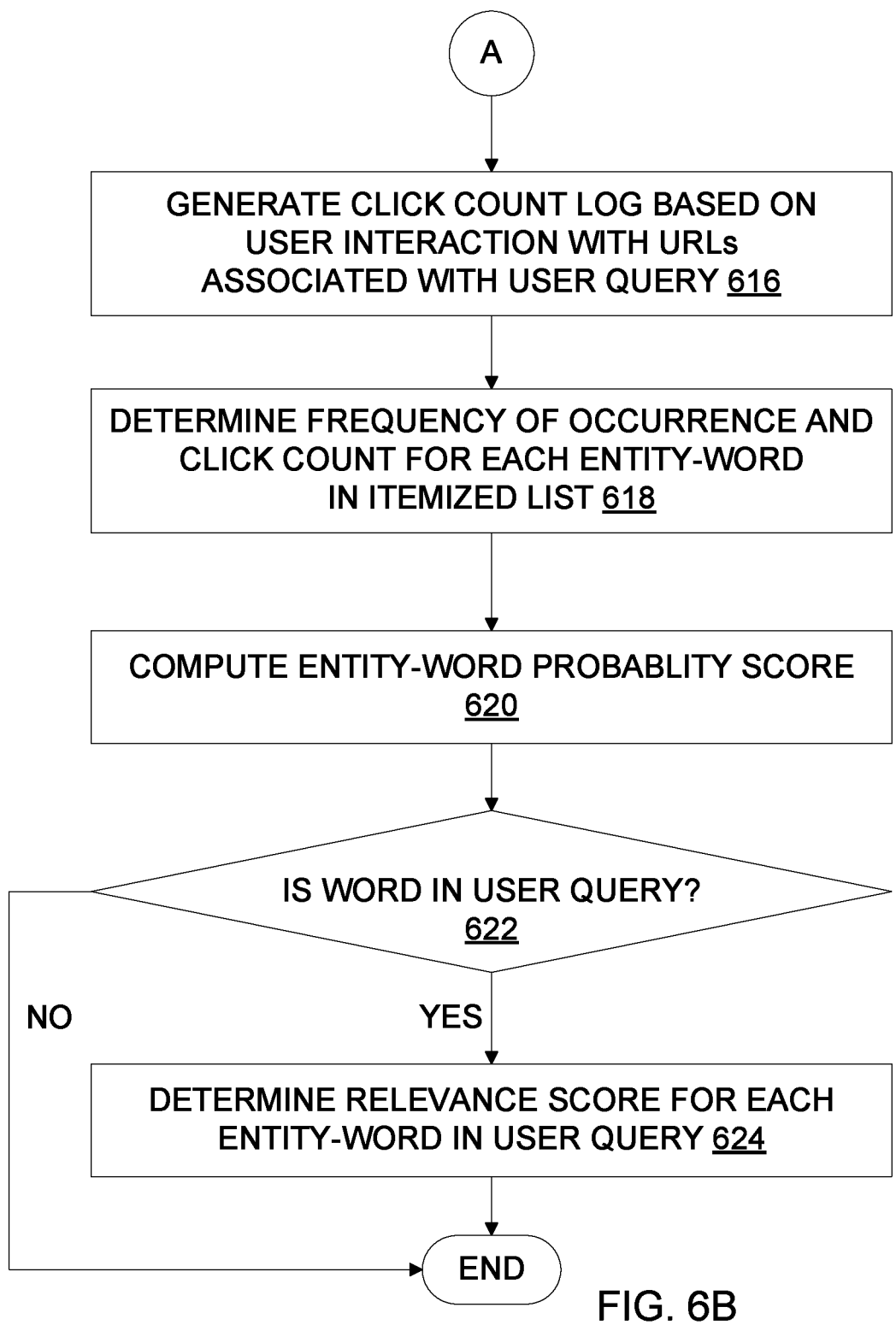
FIG. 6B is a flowchart illustrating an embodiment of a method for determining relevant entity words for improved search query relevance.

In FIG. 6B, an embodiment of the process 600 is depicted that commences with the generation of a click count log based upon click-through activity on the URLs associated with each search query, as shown at step 616. As click-through activity is determined, the stored click count log in a query database is continually updated such that a continuous running log of click count history is stored over an adjustable tracking period. In addition to determining historical click counts on words in the saved search engine results pages and in search queries, the frequency of occurrence for each entity word in the itemized list is also determined, as described previously and as shown at step 618. The frequency of occurrence of an entity word is determined over the pool of words included in a received search query, its associated search engine results pages as well as the set of stored search engine results pages and queries in an aggregated search log. After a list of identified entity words is generated along with a determination of the frequency of occurrence and the click count for each entity word, a probability distribution relevance score is computed to determine whether the identified entity word is a "relevant" entity word, as shown at step 620. The computing of an entity-word relevance score entails the application of a probability distribution, such as a Dirichlet distribution in one embodiment, to the set of words in the search query from which the entity-word was identified and extracted. The entity-word relevance score is a probability value on the applied probability distribution. After computation of the relevance score, an additional search is performed to confirm that the identified entity-word is also a term in the received user search query, as shown at decision step 622, as a first step in determining that the identified entity word is a "relevant" entity word. After determining that the entity word is relevant at this first step, a second step is performed to determine whether the computed entity-word relevance score is greater than a predetermined quantitative entity threshold level, as shown at step 624. In an embodiment, the threshold level can be an empirically derived number indicative of the then-current assessment of probability valuations for identified entity-words over the preceding observation period. The observation period in an embodiment is a six month trailing time period although this time period can vary in alternative embodiments based on empirical determinations. The process concludes if confirmation is obtained that the computed probability relevance score for each entity-word in the received search query is greater than the applied entity-word threshold. In contrast, since word relevance is determined primarily from the presence of a query word in both (a) the Domain-URLs or Domain-Titles of the stored search engine results pages and (b) a received search query, if an entity word has been identified from the parsing of the search engine results pages but is not present in a search query, as shown at step 622, then no determination of an entity-word relevance score is performed since such words are not deemed "relevant" entity words in this process. In one embodiment, should a computed entity-word relevance score fall below an applied entity-word threshold level, the word will not be deemed a "relevant" entity word.

Figure 7A:
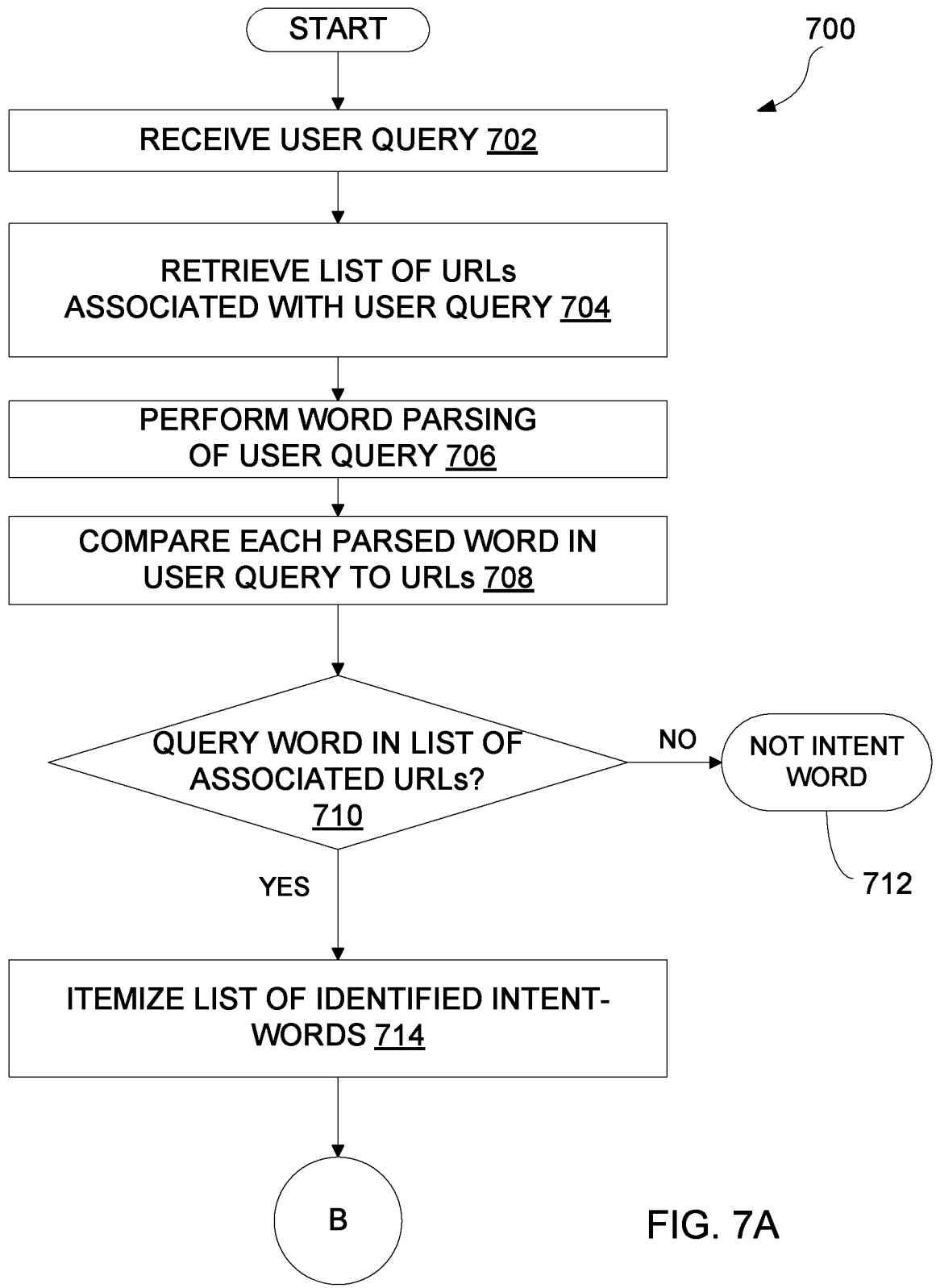
FIG. 7A is a flowchart illustrating an embodiment of a method for identifying intent words for improved search query relevance.

FIG. 7A illustrates an embodiment of a process for determining relevant intent words. This process 700 also commences with the receipt of a user search query, shown at step 702, followed by the retrieval of a list of URLs associated with the received search query, as shown at step 704. Both the received search query and the retrieved URLs associated with the search query are stored in an aggregated search log as part of a process of maintaining a running and dynamically updating log over an adjustable tracking period. Once retrieved, the words in the received query are parsed, as shown at step 706, and compared to each parsed word in the associated URLs with the received search query, as shown at step 708. In the parsing process, each query word that is determined to be in the list of associated URLs is identified as an "intent" word and added to an itemized list of such words, as shown at step 714, while each query word that is not in the list of associated URLs is deemed not to be an intent word, as shown at step 714, and no further action is performed on them.

Figure 7B:
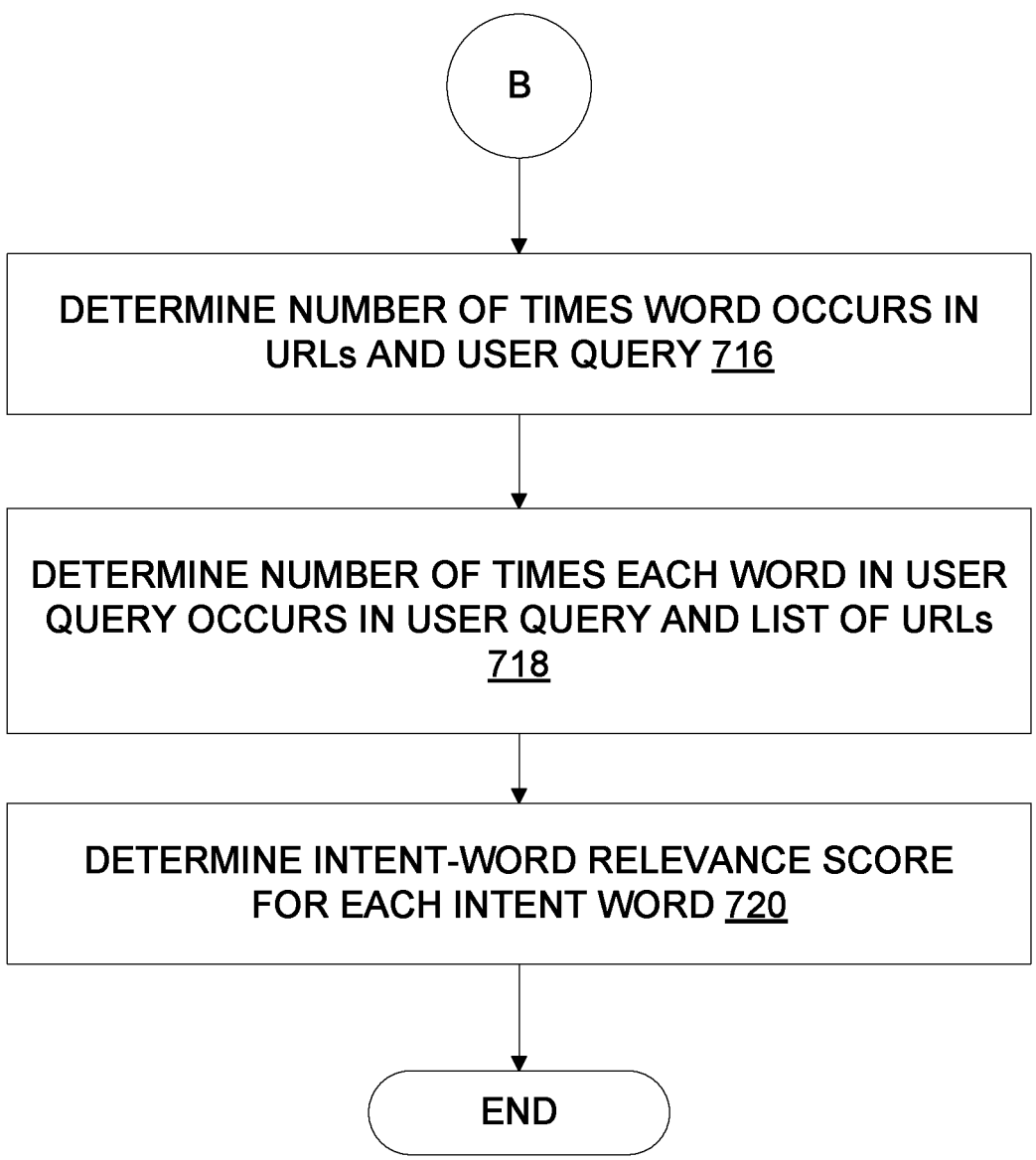
FIG. 7B is a flowchart illustrating an embodiment of a method for determining relevant intent words for improved search query relevance.

In FIG. 7B, the process 700 is extended in one embodiment to illustrate the determination of intent-word relevance scores. At this stage of the process 700, a frequency of occurrence analysis is performed to determine the number of times an identified intent-word on the itemized list occurs in the URLs and the received user search query, as shown at step 716. This step is followed by a determination of the number of times each word in the received search query occurs in the received search query and the list of associated URLs, as shown at step 718. An intent-word relevance score is then computed for each intent-word on the itemized list based on a ratio of the numbers determined in step 716 and step 718. The number produced from this ratio is the intent-word relevance score and it represents an optimization of a probability value based on an assumed a probability distribution. This number is then compared to a quantitative intent threshold level and if the score is greater than an empirically determined quantitative intent threshold level, it will then be determined to a "relevant" intent word, as shown at step 720.

Figure 8:
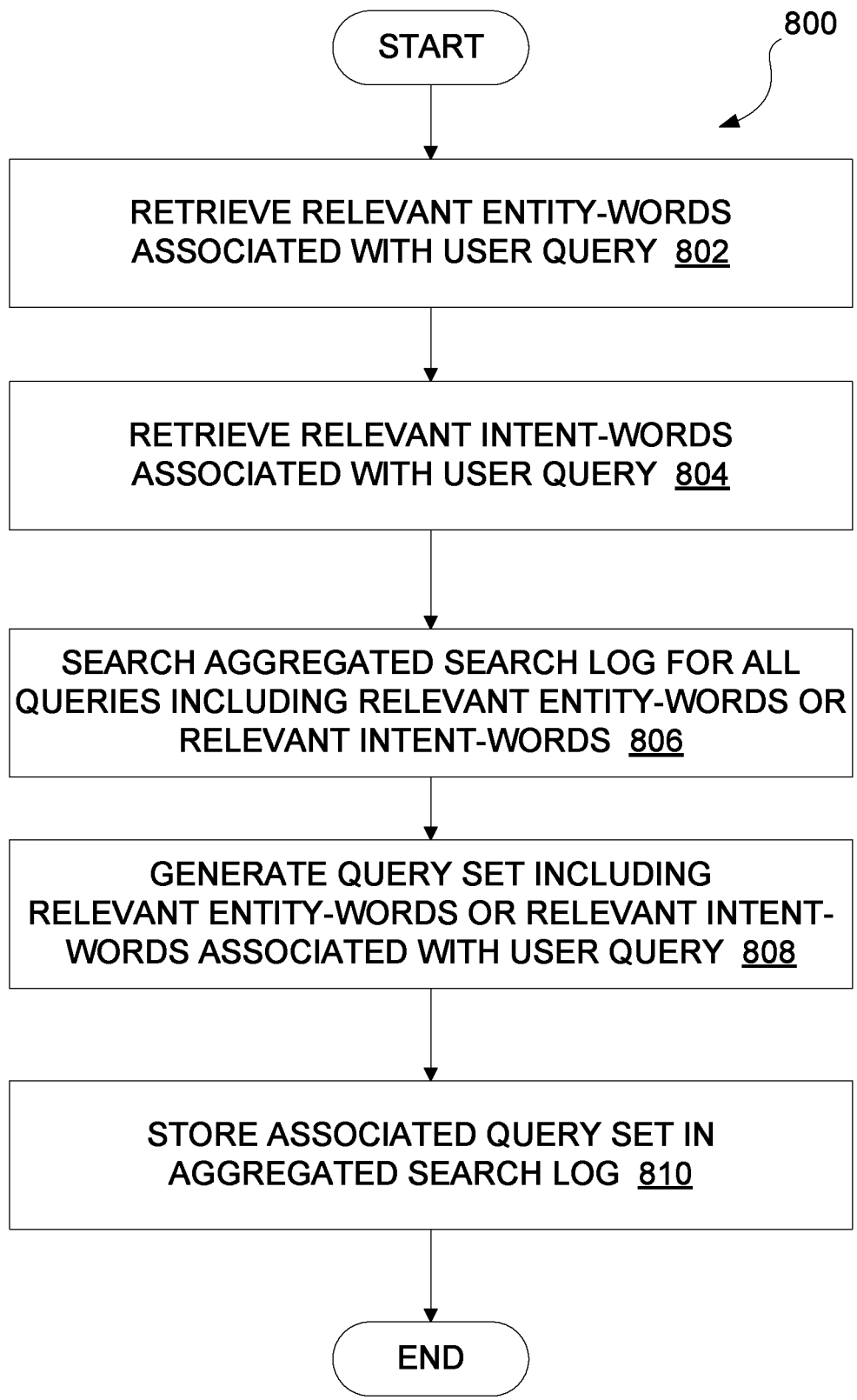
FIG. 8 is a flowchart illustrating an embodiment of a method for generating a set of query suggestions for improved search query relevance.

FIG. 8 is a flow chart illustrating an embodiment of a process for query set identification. This process 800 commences with the retrieval of relevant-entity-words associated with a search query, as shown at step 802, followed by the retrieval of relevant-intent-words also associated with the search query, as shown at step 804. The process 800 continues with the searching for all queries including the relevant-entity words and relevant-intent-words in an adjustable tracking period of stored queries and related search engine results pages in an aggregated search log, as shown at step 806. Collectively, the computed relevance scores for each of the relevant-intent-words and relevant-entity words are used to identify queries to identify and retrieve past user queries that include combinations of these relevant-entity-words or relevant-intent-words. Combinations of these past search queries comprise a query set and are compiled for relative relevance determinations, as shown at step 808. This subset of queries, referred to as a "query set," is then stored in the aggregated search log, as shown at step 810, for later retrieval to determine relative relevance ranking.

Figure 9:
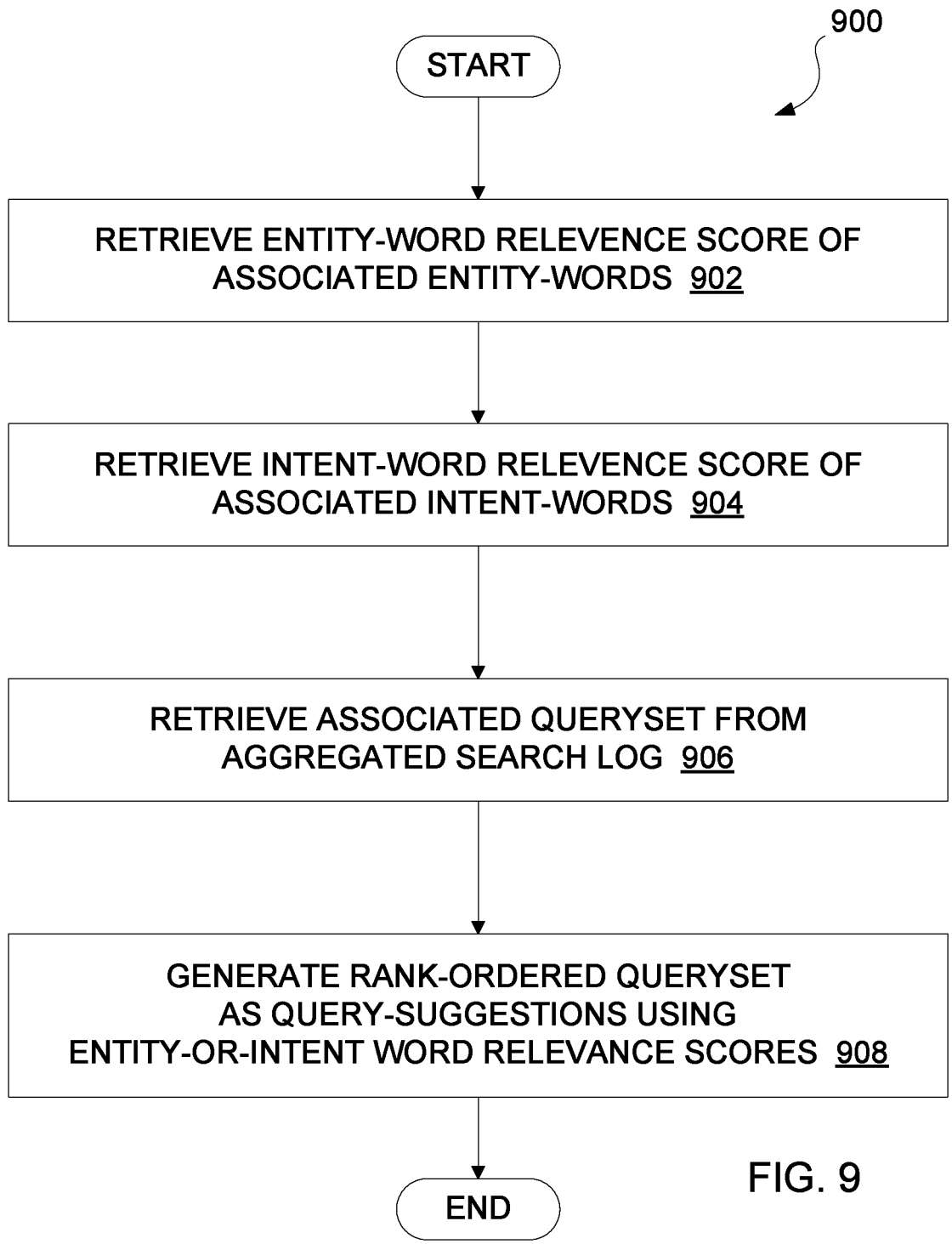
FIG. 9 is a flowchart illustrating an embodiment of a method for ranking a set of query suggestions for improved search query relevance.

FIG. 9 illustrates an embodiment of a process for generating a relevance rank-ordered set of query suggestions. The process 900 commences with the retrieval of an entity-word relevance score of an associated entity word, as shown at step 902, followed by the retrieval of the intent word relevance score of each associated intent word, as shown at step 904. Collectively, each pair of entity-word relevance score and intent-word relevance score is an indicator of the relative "importance" of a word in a search query and, correspondingly, its relevance. One or more past user queries can be retrieved, depending upon the computed entity-word relevance scores and intent-word relevance scores, from an aggregated search log that will comprise a query set associated with a received search query, as shown at step 906. Following identification and retrieval of this query set, a related process is performed that compares each relative relevance score such that the most relevant queries in a query set are listed from most relevant to least relevant, in one embodiment, based on these relevance scores for both intent and entity words. The query set is then rank-ordered as a set of query suggestions based on the entity-word relevance scores or intent-word relevance scores, as shown at step 908, and this rank-ordered set of query suggestion is then transmitted to a client device from which the user query was received for display as relevance rank-ordered alternatives or query suggestions based on the initially received user search query.

It should be understood that the various techniques described herein may be implemented in connection with hardware or software or, where appropriate, with a combination of both. Thus, the system and method of the presently disclosed subject matter, or certain aspects or portions thereof, may take the form of program code (i.e., instructions) embodied in tangible media, such as floppy diskettes, CDROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, application servers, mobile devices and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for improving search query relevance in a system having one or more processors, one or more memories, one or more storage devices, and a query collection subsystem that receives and processes search queries sent from one or more client devices, the method comprising:

executing, by the query collection subsystem, a current-user search query using an online search engine, the current-user search query having a plurality of search terms;

retrieving, by the query collection subsystem, search-page-data generated from the executing of the current-user search query using the online search engine, the search-page-data including a document-title and a universal resource locator (URL), the document-title being a title of a document displayed in the generated search-page-data and associated with the URL;

determining, by the query collection subsystem, that a first search term in the current-user search query is relevant-entity word from computing an entity-word relevance score for the first search term based upon the first search term being included in at least one of the document-title or the URL;

determining, by the query collection subsystem, that a second term in the current-user search query is a relevant intent word from computing an intent-word relevance score based on a number of times the second search term appears in the URL relative to a number of times that the second search term appears in a set of URLs identified in a search engine log;

based upon the first search term being determined to be a relevant entity word or based upon the second search term being determined to be a relevant intent word, retrieving, from the search engine log using the query collection subsystem, a stored past-user search query that includes at least one of the first search term or the second search term; and transmitting, by the query collection subsystem and for display on a user interface of a client device, the retrieved past user-search query as a query suggestion for the current-user search query.

2. The method of claim 1 wherein the past-user search query is received over an adjustable tracking period.

3. The method of claim 1 wherein the current-user search query and the past-user search query are received from one or more of a human user or an automated bot.

4. The method of claim 1 wherein, after the retrieving of the generated search-page-data, the method further comprises:

parsing, by the query collection subsystem, a plurality of words in the retrieved search-page-data; and retrieving, by the query collection subsystem, one or more Domain-URLs and one or more Domain-Titles from the search-page-data, at least one of the Domain-URLs or the Domain-Titles including at least one-exact-match word for the plurality of the parsed words in the retrieved search-page-data.

5. The method of claim 4 wherein determining that the first term in the current-user search query is a relevant entity word comprises:

determining, by the query collection subsystem, a set of entity-words in the plurality of parsed words in the retrieved search-page-data when one or more of the parsed words is an exact-match-word in at least one of the one or more Domain-URLs or the one or more Domain-Titles;

providing a click count log of detected user clicks on each of the entity-words over an adjustable tracking period, the click count log storing a number equal to detected click counts of a current-user and a plurality of past-users over the tracking period; and determining, by the query collection subsystem, an entity-word relevance score for each word in the set of entity-words using a probability distribution relating: (a) a frequency of occurrence of an entity-word in the retrieved search-page-data and the current-user search query, and (b) the detected click counts on the entity-word, the distribution applied to establish the entity-word relevance score as a first probability value, the entity-word relevance score identifying a relevant-entity-word when the first probability value of the entity-word in the set of entity-words exceeds a quantitative entity threshold level, the quantitative entity threshold level determined from the entity-word relevance scores of the set of query suggestions over a pre-determined time period.

6. The method of claim 1 wherein determining that the second term in the current-user search query is a relevant intent word comprises:
  parsing, by the query collection subsystem, a plurality of search terms in the current-user search query;
  determining, by the query collection subsystem, a set of intent-words in the plurality of parsed search terms when one or more of the parsed search terms is an exact-match-word in the one or more URLs; and
  determining, by the query collection subsystem, an intent-word relevance score for each word in the set of intent-words using a probability distribution relating: (a) a number of times one of the one or more intent-words occurs in the current-user search query and the URLs, and (b) a number of times each intent-word occurs in the current-user search query and the URLs, the distribution applied to establish the intent-word relevance score as a second probability value, the intent-word relevance score identifying a relevant-intent-word when the second probability value of the intent-word in the set of intent-words exceeds a quantitative intent threshold level, the quantitative intent threshold level determined from the intent-word relevance scores of the set of query suggestions over a pre-determined time period.

7. The method of claim 1 wherein the retrieving of the stored past-user query comprises ranking, by the query collection subsystem, each of several retrieved past-user search queries in a descending order of entity-word relevance scores for each relevant-entity-word and a descending order of intent-word relevance scores for each relevant-intent-word, the ranked search queries comprising the query suggestion.

8. The method of claim 7 wherein the transmitting of the past-user search query comprises transmitting, by the query collection subsystem, the ranked search queries for display on the user interface of the client device.

9. A computer system for improved search query relevance, the system comprising:
  one or more processors;
  one or more secondary storage devices communicatively coupled to the one or more processors;
  one or more memories from which instructions and data are retrieved by the one or more processors and in which instructions and data are stored by the one or more processors, the one or more memories having instructions stored thereon for executing a search query collection subsystem;
  the search query collection subsystem communicatively coupled to a search query database, the database storing a click count log and a search log, the search log including an indexed table referencing a plurality of past-user search queries and related search-page-data for each of the plurality of past-user queries, the search query collection subsystem adapted to:
  execute a current-user search query using an online search engine, the current-user search query having a plurality of search terms;
  retrieve search-page-data for the current-user search query using the online search engine, the search-page-data including a document-title and a universal resource locator (URL), the document-title being a title of a document associated with the URL;
  determine that a first term in the current-user search query is a relevant-entity word from computing an entity-word relevance score for the first term;
  determine that a second term in the current-user search query is a relevant-intent word from computing an intent-word relevance score based on a number of times the second term appears in the current-user search query and the URL relative to other search terms in the current-user search query and the URL;
  based upon the first search term being determined to be a relevant entity word and the second search term being determined to be a relevant intent word, retrieve a past-user search query that includes at least one of the first search term or the second search term; and
  transmit a query suggestion for display on a user interface of a client device, the query suggestion being the retrieved past-user search query.

10. The system of claim 9 wherein the past-user search query is stored in the search log over an adjustable tracking period.

11. The system of claim 9 wherein the current-user search query and the past-user search query are received from one or more of a human user and an automated bot.

12. The system of claim 9 wherein the search query collection subsystem is further adapted to:
  parse a plurality of words in the retrieved search-page-data; and
  retrieve one or more Domain-URLs and one or more Domain-Titles from the search-page-data, at least one of the Domain-URLs or the Domain-Titles including at least one exact-match-word for the one or more of the parsed words in the retrieved search-page-data, each Domain-URL being a top-level domain name and each Domain-Title being one of the one or more document-titles.

13. The system of claim 12 wherein the search query collection subsystem is further adapted to:
  determine a set of entity-words in the plurality of parsed words in the retrieved search-page-data when one or more of the parsed words is an exact-match-word in at least one of the one or more Domain-URLs or the one or more Domain-Titles;
  detect user clicks on each of the entity-words over an adjustable tracking period, the click count log storing a number equal to detected click counts of a current-user and a plurality of past-users over the tracking period; and
  determine an entity-word relevance score for each word in the set of entity-words using a probability distribution relating: (a) a frequency of occurrence of an entity-word in the retrieved search-page-data and the current-user search query, and (b) the detected click counts on the entity-word, the distribution applied to establish the entity-word relevance score as a first probability value, the entity-word relevance score identifying a relevant-entity-word when the first probability value of the entity-word in the set of entity-words exceeds a quantitative entity threshold level, the quantitative entity threshold level determined from the entity-word relevance scores of the set of query suggestions over a pre-determined time period.

14. The system of claim 9 wherein the search query collection subsystem is further adapted to:
  parse a plurality of search terms in the current-user search query;
  determine a set of intent-words in the plurality of parsed search terms when one or more of the parsed search terms is an exact-match-word in the one or more URLs; and determine an intent-word relevance score for each word in the set of intent-words using a probability distribution relating: (a) a number of times one of the one or more intent-words occurs in the current-user search query and the URLs, and (b) a number of times each intent-word occurs in the current-user search query and the URLs, the distribution applied to establish the intent-word relevance score as a second probability value, the intent-word relevance score identifying a relevant-intent-word when the second probability value of the intent-word in the set of intent-words exceeds a quantitative intent threshold level, the quantitative intent threshold level determined from the intent-word relevance scores of the set of query suggestions over a pre-determined time period.

15. The system of claim 9, wherein the plurality of past-user search queries are retrieved, wherein the search query collection subsystem is further adapted to rank each of the retrieved past-user search queries in a descending order of entity-word relevance scores for each relevant-entity-word and a descending order of intent-word relevance scores for each relevant-intent-word, the ranked search queries comprising a set of query suggestions associated with the current-user search query.

16. The system of claim 15 wherein the search query collection subsystem is further adapted to transmit the ranked search queries for display on the user interface of the client device.

17. A non-transitory computer-readable medium storing instructions that, when executed by a processor, cause the processor to perform a method for improving search query relevance, the method comprising:
executing a current-user search query using an online search engine, the current-user search query having a plurality of search terms;
retrieving search-page-data generated from the executing of the current-user search query using the online search engine, the search-page-data including a document-title and a universal resource locator (URL), the document-title being a title of a document displayed in the generated search-page-data and associated with the URL;
determining that a first search term in the current-user search query is a relevant-entity-word from computing an entity-word relevance score for the first search term based upon the first search term being included in at least one of the document-title or the URL;
determining that a second term in the current-user search query is a relevant intent word from computing an intent-word relevance score based on a number of times the second search term appears in the URL relative to a number of times that the second search term appears in a set of URLs identified in a search engine log;
based upon the first search term being determined to be a relevant entity word or based upon the second search term being determined to be a relevant intent word, retrieving, from the search engine log, a stored past-user search query that includes at least one of the first search term or the second search term; and
transmitting, to a client computing device and for presenting at the client computing device, the retrieved past user-search query as a query suggestion for the current-user search query.

18. The non-transitory computer-readable medium of claim 17, wherein the past-user search query is received over an adjustable tracking period.

19. The non-transitory computer-readable medium of claim 17, wherein the current-user search query and the past-user search query are received from one or more of a human user and an automated bot.

20. The non-transitory computer-readable medium of claim 17, wherein, after the retrieving of the generated search-page-data, the method further comprises:
parsing, by the query collection subsystem, a plurality of words in the retrieved search-page-data; and
retrieving, by the query collection subsystem, one or more Domain-URLs and one or more Domain-Titles from the search-page-data, at least one of the Domain-URLs or the Domain-Titles including at least one-exact-match word for the plurality of the parsed words in the retrieved search-page-data.

* * * * *